United States Patent
Jump et al.

(10) Patent No.: US 11,880,860 B1
(45) Date of Patent: Jan. 23, 2024

(54) DIGITAL PROMOTION PROCESSING SYSTEM INCLUDING SHOPPER SELECTABLE REDEMPTION CHANNELS AND RELATED METHODS

(71) Applicant: Inmar Clearing, Inc., Winston-Salem, NC (US)

(72) Inventors: Andrew B. Jump, Lewisville, NC (US); Ali Mirian, Brooklyn, NY (US); Srinivasan Varadarajan, Winston-Salem, NC (US); Tom Fogarty, Detroit, MI (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/870,580

(22) Filed: Jul. 21, 2022

(51) Int. Cl.
  *G06Q 30/0238* (2023.01)
  *G06Q 30/0601* (2023.01)
  *G06Q 30/0207* (2023.01)

(52) U.S. Cl.
  CPC ..... *G06Q 30/0238* (2013.01); *G06Q 30/0222* (2013.01); *G06Q 30/0635* (2013.01)

(58) Field of Classification Search
  CPC ........... G06Q 30/0238; G06Q 30/0222; G06Q 30/0635
  See application file for complete search history.

(56) References Cited

U.S. PATENT DOCUMENTS

| | | | |
|---|---|---|---|
| 8,668,146 B1 * | 3/2014 | McGhie | G06Q 30/0228 235/487 |
| 10,290,009 B2 | 5/2019 | Thomas et al. | |
| 2011/0071892 A1 * | 3/2011 | Dickelman | G06Q 20/20 705/14.17 |
| 2014/0108116 A1 * | 4/2014 | Quinlan | G06Q 30/02 705/14.26 |
| 2015/0088607 A1 * | 3/2015 | Georgoff | G06Q 30/0202 705/14.46 |

OTHER PUBLICATIONS

Teng et al., "Examining actual consumer usage of E-wallet: A case study of big data analytics" (published in Computers in Human Behavior, vol. 121 (Year: 2021).*

* cited by examiner

Primary Examiner — James M Detweiler
Assistant Examiner — Patrick Kim
(74) Attorney, Agent, or Firm — ALLEN, DYER, DOPPELT, GILCHRIST, P.A.

(57) ABSTRACT

A digital promotion processing system may include a shopper device associated with a given shopper, and a promotion processing server. The server may generate a given promotion identifier associated with a digital promotion for a given product. The digital promotion may be redeemable via different redemption channels and may have a redeemable value associated therewith. The server may communicate the digital promotion to the shopper device, cooperate with the shopper device to display, on a display of the shopper device, the digital promotion, and cooperate with the shopper device to permit shopper-selection of one of the different redemption channels based upon display of the digital promotion. The server may determine when the given product has been purchased by the given shopper, and when so, apply the redeemable value according to the shopper-selected redemption channel and based upon the given promotion identifier.

20 Claims, 4 Drawing Sheets

DIGITAL PROMOTION PROCESSING SYSTEM INCLUDING SHOPPER SELECTABLE REDEMPTION CHANNELS AND RELATED METHODS

TECHNICAL FIELD

The present invention relates to the field of promotion processing, and, more particularly, to processing a digital promotion based upon a selectable redemption channel.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

Another form of marketing or promotion may be a rebate. A rebate, like a coupon, is a form of discount applicable toward the purchase of a given product. However, unlike a coupon, a rebate is paid retrospectively.

SUMMARY

A digital promotion processing system may include a shopper device associated with a given shopper, and a promotion processing server configured to generate a given promotion identifier associated with a digital promotion for a given product. The digital promotion may be redeemable via a plurality of different redemption channels and having a redeemable value associated therewith. The promotion processing server may be configured to communicate the digital promotion to the shopper device, cooperate with the shopper device to display, on a display of the shopper device, the digital promotion, and cooperate with the shopper device to permit shopper-selection of one of the plurality of different redemption channels based upon display of the digital promotion. The promotion processing server may also be configured to determine when the given product has been purchased by the given shopper, and when so, apply the redeemable value according to the shopper-selected redemption channel and based upon the given promotion identifier.

One of the plurality of different redemption channels may include redemption at a point-of-sale (POS) terminal. The promotion processing server may be configured to cooperate with the POS terminal to determine whether the given product has been purchased, and when so cooperate with the POS terminal to apply the redeemable value toward purchase of the given product at the POS terminal, for example.

One of the plurality of different redemption channels may include a future redemption. The promotion processing server may be configured to save the digital promotion in a digital wallet associated with the given shopper, and upon purchase of the given product, cooperate with the digital wallet to apply the redeemable value toward purchase of the given product, for example.

The given shopper may have a loyalty identifier associated therewith for the given retailer at which the given product has been purchased. The promotion processing server may be configured to save the digital promotion to the digital wallet associated with the given shopper based upon the loyalty identifier, for example.

One of the plurality of different redemption channels may include cashback to the given shopper. The promotion processing server may be configured to, upon purchase of the given product, cooperate to provide cashback in an amount equal to the redeemable value to the given shopper, for example. The promotion processing server may be configured to prompt the given shopper, upon selection of the cashback redemption channel, to load the redeemable value to a payment card associated with a given retailer at which the given product has been purchased. The promotion processing server may be configured to prompt the given shopper, upon selection of the cashback redemption channel, to cooperate with an online payments system to communicate the redeemable value to an account associated with the given shopper, for example.

A promotional budget may be associated with the given promotion identifier. The promotion processing server may be configured to debit the promotional budget with the redeemable value based upon each redemption of the digital promotion and irrespective of the plurality of different redemption channels, for example.

A method aspect is directed to a method of processing a digital promotion. The method may include using a promotion processing server to generate a given promotion identifier associated with a digital promotion for a given product. The digital promotion may be redeemable via a plurality of different redemption channels and having a redeemable value associated therewith. The method may include using the promotion processing server to communicate the digital promotion to a shopper device associated with a given shopper, cooperate with the shopper device to display, on a display of the shopper device, the digital promotion, and cooperate with the shopper device to permit shopper-selection of one of the plurality of different redemption channels based upon display of the digital promotion. The method may also include using the promotion processing server to determine when the given product has been purchased by the given shopper, and when so, apply the redeemable value according to the shopper-selected redemption channel and based upon the given promotion identifier.

A computer readable medium aspect is directed to a non-transitory computer readable medium for processing a digital promotion. The non-transitory computer readable medium includes computer executable instructions that when executed by a processor cause the processor to perform operations. The operations may include generating a given promotion identifier associated with a digital promotion for a given product. The digital promotion may be redeemable via a plurality of different redemption channels and having a redeemable value associated therewith. The operations may include communicating the digital promotion to a shopper device associated with a given shopper, cooperating with the shopper device to display, on a display of the shopper device, the digital promotion, and cooperating with the shopper device to permit shopper-selection of one of the plurality of different redemption channels based upon display of the digital promotion. The operations may also include determining when the given product has been purchased by the given shopper, and when so, applying the redeemable value according to the shopper-selected redemption channel and based upon the given promotion identifier.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
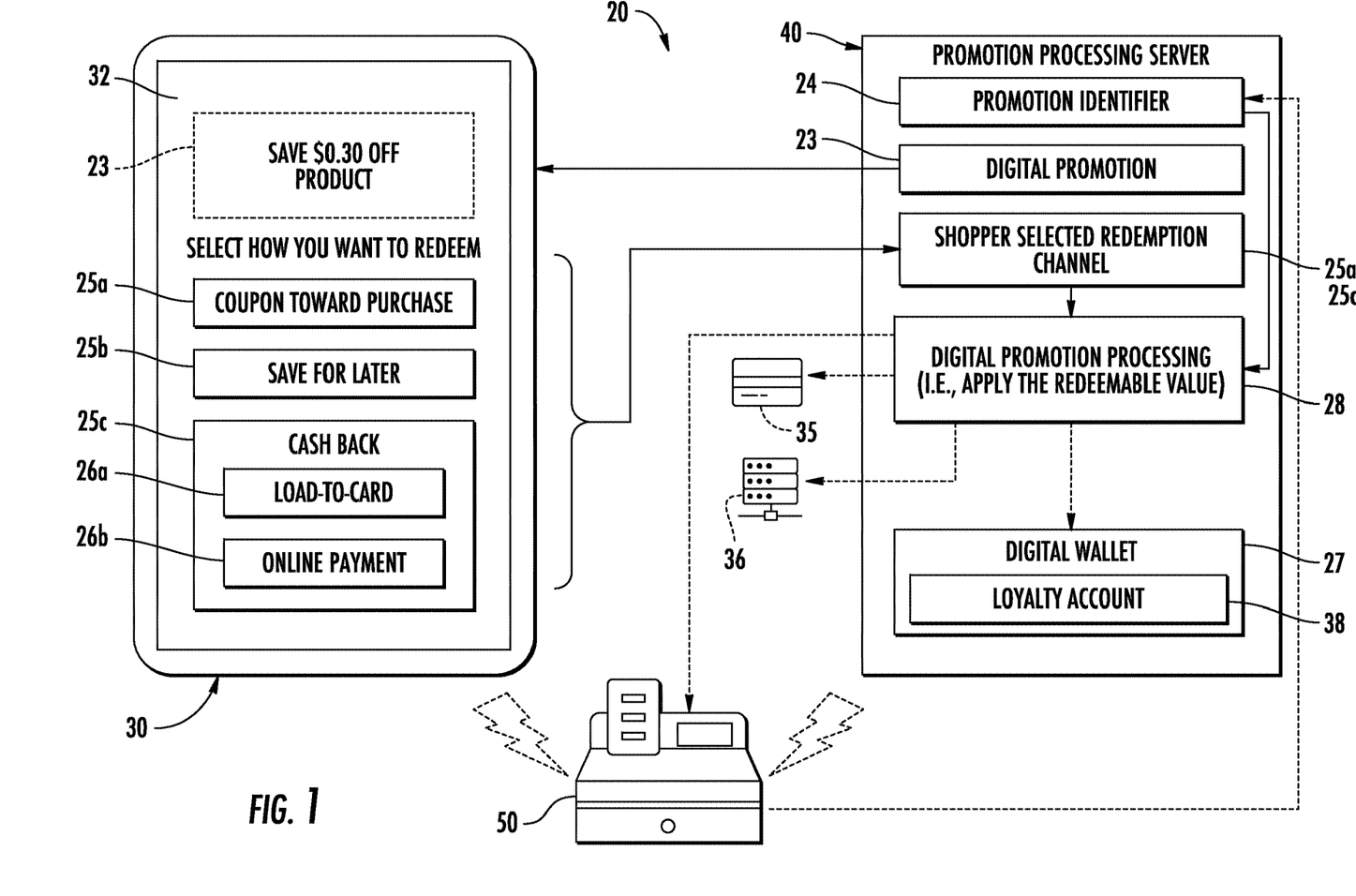
FIG. 1 is a schematic diagram of a digital promotion processing system in accordance with an embodiment.
Figure 2:
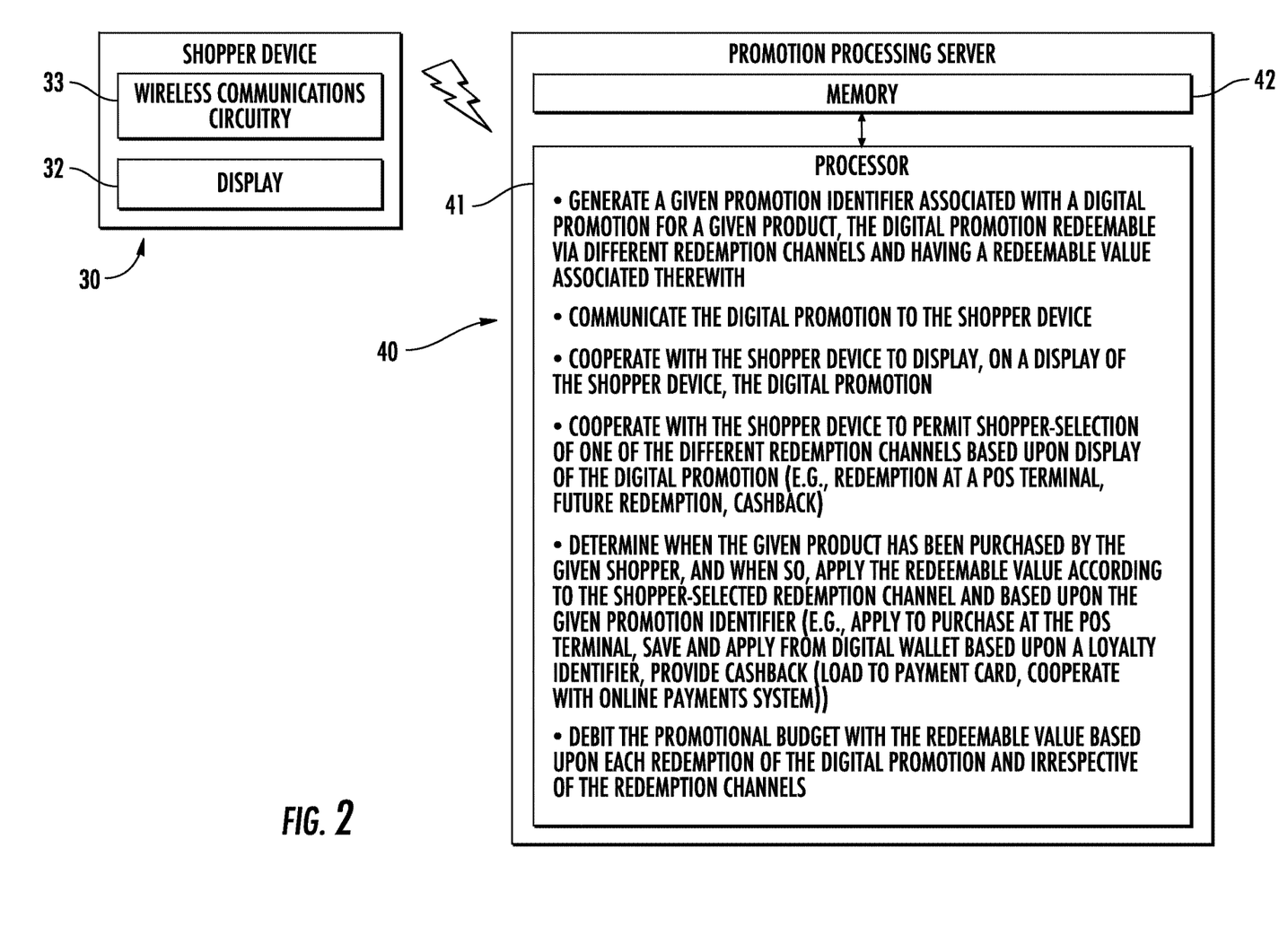
FIG. 2 is a schematic block diagram of a portion of the digital promotion processing system of FIG. 1.

Referring initially to FIGS. 1-2, a digital promotion processing system 20 includes a shopper device 30. The shopper device 30 is associated with a given shopper. The shopper device 30 is illustratively in the form of a mobile wireless communications device or smartphone and includes a display 32, wireless communications circuitry 33 (e.g., cellular, WiFi, near-field, and/or other short-range communications circuitry). While the shopper device 30 is in the form of a mobile wireless communications device, those skilled in the art will appreciate that the shopper device may be in the form of another type of device, for example, a tablet computer, personal computer, or wearable device. There may be more than one shopper device each associated with a respective shopper.

The digital promotion processing system 20 also includes a promotion processing server 40. The promotion processing server 40 includes a processor 41 and an associated memory 42. While operations of the promotion processing server 40 may be described herein, it should be appreciated that the operations are performed by way of operations between the processor 41 and the memory 42.

Figure 3:
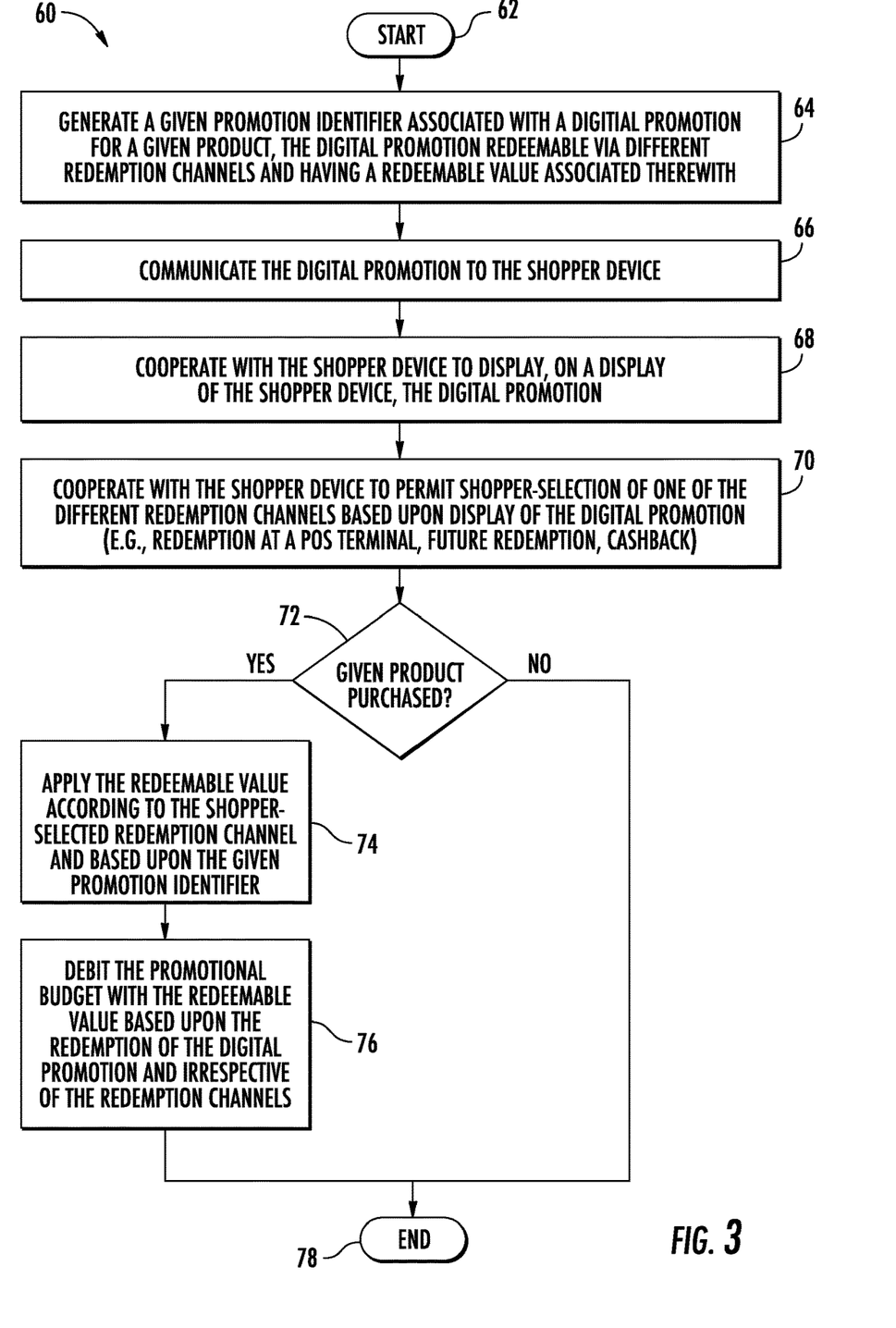
FIG. 3 is a flow chart illustrating operation of the promotion processing server of FIG. 1.

Referring now to the flowchart 60 in FIG. 3, beginning at Block 62, operations of the promotion processing server 40 will now be described. At Block 64, the promotion processing server 40 generates a given promotion identifier 24 associated with a digital promotion 23. As will be appreciated by those skilled in the art, a retailer or manufacturer may desire to run a promotional campaign that includes a digital coupon, digital rebate, and/or cash back promotion. The retailer or manufacturer may have an associated budget for the campaign, the budget of which may be debited based upon redemption of the digital promotion. Typically, when a retailer or manufacturer is desirous of having more than a single type of promotion (i.e., digital coupon, digital rebate, etc.), each type of promotion has an associated promotion identifier associated therewith.

The digital promotion 23 generated by the promotion processing server 40 is redeemable via different redemption channels 25a-25c and has a redeemable value associated therewith. In other words, the digital promotion 23 may, as one of the redemption channels 25a, be redeemable as a digital coupon at a point-of-sale (POS) terminal 50 whereby the redeemable value is applied to an associated product during at the conclusion of a purchase transaction at the POS terminal. The POS terminal 50 may be physically at a retailer, for example, or may be a virtual POS terminal in an online e-commerce environment.

The digital promotion 23 generated by the promotion processing server 40 may, as another one of the redemption channels 25a-25c, be a future redemption 25b, for example, savable to a digital wallet 27 associated with the given shopper. The digital wallet 27 may be associated with a given retailer or may be a global digital wallet, for example.

The digital promotion 23 generated by the promotion processing server 40 may, as another one of the redemption channels 25a-25c, be cashback to the given shopper 25c. The cashback to the given shopper may be in the form of a load-to-card promotion 26a or true cash back 26b to the given shopper, as will be described in further detail below. While several redemption channels 25a-25c are described herein, those skilled in the art will appreciate that there may be other and/or additional redemption channels.

The promotion processing server 40, at Block 66, communicates, for example, wirelessly, the digital promotion 23 to the shopper device 30. The digital promotion 23 may be communicated upon generation by the promotion processing server 40, at a desired date and time after generation, or based upon the shopper device 30 being in a geographic area for redemption, for example, at or within a retailer where the digital promotion is redeemable. The promotion processing server 40 may determine the shopper device 30 is at or within the threshold geographic area of a retailer based upon a geographic position system or receiver of the shopper device, and/or communication with one or more wireless networks.

The promotion processing server 40 cooperates with the shopper device 30 to display the digital promotion 23 on the display 32 of the shopper device (Block 68). The given shopper may provide input to the shopper device 30 to operate an application that displays the digital promotion 23. The application may be associated with a given retailer, for example.

At Block 70, the promotion processing server 40 cooperates with the shopper device 30 to permit shopper-selection of one of the different redemption channels 25a-25c. For example, the promotion processing server 40 may cooperate with the shopper device 30 to prompt the given shopper to select which of the redemption channels 25a-25c the given shopper desires. More particularly, the different available redemption channels 25a-25c for the digital promotion 23 may be displayed on the display 32 for the given shopper to select, for example, by providing input to the shopper device 30.

The promotion processing server 40, at Block 72, determines when the given product for purchase has been purchased by the given shopper. The promotion processing server 40 may determine when the given product is purchased based upon given promotion identifier 24. For example, the promotion processing server 40 may obtain product purchase information from one or more retailers along with the given promotion identifier 24, and may perform validation functions, such as determining whether the digital promotion 23 is valid or has not expired.

When, at Block 72, the given product for purchase has been purchased by the given shopper, the promotion processing server 40 applies the redeemable value according to the shopper-selected redemption channel 25a-25c and based upon the promotion identifier 24 (Block 74). More particularly, the promotion processing server 40 determines which redemption channel 25a-25c the given shopper selected and processes the digital promotion 23 for redemption 28 based thereon.

Figure 4:
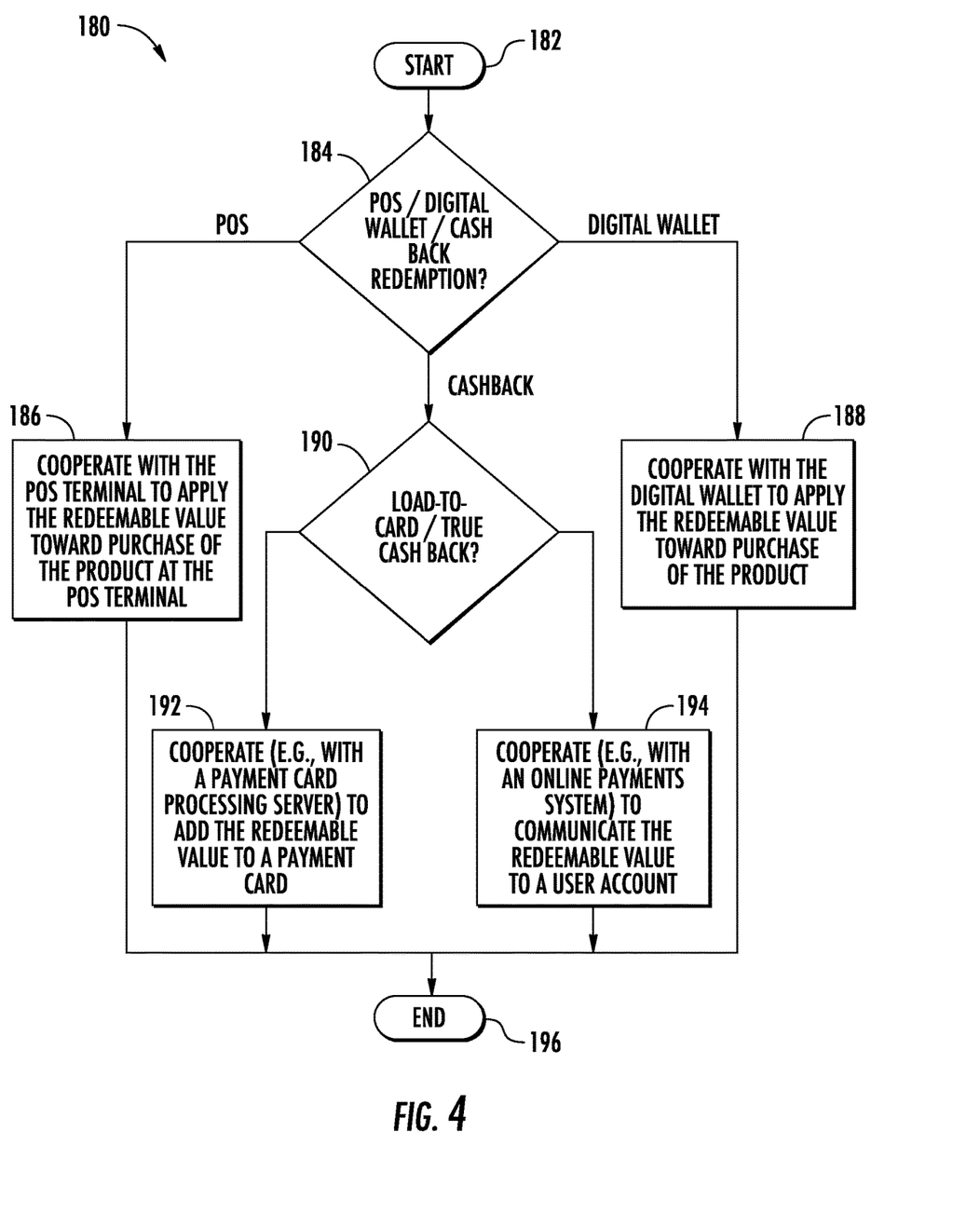
FIG. 4 is a more detailed flow chart illustrating operation of the promotion processing server of FIG. 1.

Referring now additionally to the flowchart 180 in FIG. 4, beginning at Block 182, further details of applying the digital promotion 23 will be described. At Block 184, the promotion processing server 40 determines which redemption channel 25a-25c the given shopper selected. For example, if the given shopper selects redemption at the POS terminal 50, the promotion processing server 40 cooperates with the POS terminal to apply the redeemable value toward purchase of the product at the POS terminal (Block 186). The POS terminal 50 may communicate the promotion identifier 24 to the promotion processing server 40, which may match the selected redemption channel 25a-25c to the given shopper, for example, based upon the shopper identifier, such as a username, email address, phone number, shopper device identifier, and/or loyalty account identifier 38. Based upon a validation, for example, the promotion processing server 40 may cooperate with the POS terminal 50 to apply the redeemable value toward purchase of the product at the POS terminal. For example, if the digital promotion 23 is for $0.30 off the purchase of the product, the $0.30 will be applied as a discount at the POS terminal 50.

If the given shopper selected a future redemption as the shopper-selected redemption channel (Block 184), the promotion processing server 40 would have saved to the digital promotion 23 to the digital wallet 27 upon selection, for example, based upon a shopper identifier, such as a username, email address, phone number, shopper device identifier, and/or loyalty account identifier 38 associated with a given retailer. The promotion processing server 40, upon purchase of the product at Block 72, cooperates with the digital wallet 27 to apply the redeemable value toward purchase of the product (Block 188). The promotion processing server 40 may cooperate with the digital wallet 27 to obtain the promotion identifier 24, which may match the selected redemption channel 25a-25c to the given shopper, for example, based upon a shopper identifier, such as a username, email address, phone number, shopper device identifier, and/or loyalty account identifier 38. Based upon a validation, for example, the promotion processing server 40 may cooperate with the digital wallet 27 to redeem the digital promotion 23 (e.g., by removing the digital promotion from the digital wallet, and applying the redeemable value via cooperation with a POS terminal, e-commerce platform, etc.).

If the given shopper selected cashback 25c as the shopper-selected redemption channel 25a-25c (Block 184), the promotion processing server 40, upon purchase of the product at Block 72, cooperates to provide cashback in an amount equal to the redeemable value. More particularly, the promotion processing server 40 may prompt the given shopper, upon selection of the cashback redemption channel 25c to either load the redeemable value to a payment card 35 (i.e., a load-to-card promotion 26a) or to provide true cash back 26b (i.e., provide a cash payment) (Block 190).

Upon selection of the load-to-card option 26a, the promotion processing server 40 may load the redeemable value to a payment card that may be associated with a given retailer at which the product has been purchased, for example, similar to a gift-card for the given retailer. In other words, the promotion processing server 40 cooperates, for example, with a payment card processing server, to add funds to a payment card (Block 192). In some embodiments, the payment card 35 may not be for a given retailer and may be redeemable at any number of retailers, such as, for example, a prepaid payment card.

Upon selection of the cash payment option 26b, the promotion processing server 40 may cooperate with an online payments system 36 to communicate the redeemable value to an account associated with the given shopper (Block 194). The online payments system 36 may be a payments gateway, for example, the permits users to exchange funds. The redeemable value may be deposited into an account at the online payments system, may deposit the redeemable value in a bank account tied to or associated with the given shopper via the online payments system, or may deposit the redeemable value as a payment (i.e., provide a credit) for a credit account associated with the given shopper. In some embodiments, the redeemable value may be donated to a charity or charitable organization, for example, by depositing the redeemable value in an account associated with the charity and identified as being from the given shopper. Operations associated with the cashback redemption channel 25c end at Block 196.

As noted above, a promotional budget may be associated with the given promotion identifier 24. For example, the promotional budget may be applicable across or for multiple redemption channels 25a-25c. The promotion processing server 40 debits the promotional budget with the redeemable value based upon each redemption of the digital promotion 23 and irrespective of the redemption channels 25a-25c (Block 76). In other words, upon redemption, the given promotion identifier 24 may be passed, for example, to the promotion processing server 40 to debit the account or promotional budget. Operations end at Block 78.

A method aspect is directed to a method of processing a digital promotion 23. The method includes using a promotion processing server 40 to generate a given promotion identifier 24 associated with a digital promotion 23 for a given product. The digital promotion 23 may be redeemable via a plurality of different redemption channels 25a-25c and having a redeemable value associated therewith. The method includes using the promotion processing server 40 to communicate the digital promotion 23 to a shopper device 30 associated with a given shopper, cooperate with the shopper device to display, on a display 32 of the shopper device, the digital promotion, and cooperate with the shopper device to permit shopper-selection of one of the plurality of different redemption channels 25a-25c based upon display of the digital promotion. The method also includes using the promotion processing server 40 to determine when the given product for purchase has been purchased by the given shopper, and when so, apply the redeemable value according to the shopper-selected redemption channel 25a-25c and based upon the given promotion identifier 24.

A computer readable medium aspect is directed to a non-transitory computer readable medium for processing a digital promotion 23. The non-transitory computer readable medium includes computer executable instructions that when executed by a processor 41 cause the processor to perform operations. The operations include generating a given promotion identifier 24 associated with a digital promotion 23 for a given product. The digital promotion 23 is redeemable via a plurality of different redemption channels 25a-25c and having a redeemable value associated therewith. The operations include communicating the digital promotion 23 to a shopper device 30 associated with a given shopper, cooperating with the shopper device to display, on a display 32 of the shopper device, the digital promotion, and cooperating with the shopper device to permit shopper-selection of one of the plurality of different redemption channels 25a-25c based upon display of the digital promotion. The operations also include determining when the given product for purchase has been purchased by the given shopper, and when so, applying the redeemable value according to the shopper-selected redemption channel 25a-25c and based upon the given promotion identifier 24.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:
   a shopper device associated with a given shopper; and
   a promotion processing server configured to
      generate a given promotion identifier associated with a digital promotion for a given product, the digital promotion redeemable via a plurality of different redemption channels and having a redeemable value associated therewith, the plurality of different redemption channels comprising redemption at a point-of-sale (POS) terminal, a future redemption, and cashback to the given shopper,
      communicate the digital promotion to the shopper device,
      communicate with the shopper device to cause the shopper device to generate, on a display of the shopper device a user interface including the digital promotion and a plurality of different shopper-selectable inputs representing the plurality of different redemption channels,
      cooperate with the shopper device to permit shopper-selection, via the user interface, of one of the plurality of different shopper-selectable inputs representing a corresponding one of the plurality of different redemption channels based upon display of the digital promotion on the display,
      communicate with the shopper device to obtain the shopper selection of the one of the different shopper-selectable inputs to the user interface,
      cooperate to save the digital promotion to a digital wallet associated with the given shopper upon obtaining the shopper-selected one of the different shopper-selectable inputs to the user interface corresponding to the future redemption,
      communicate with the shopper device to cause the shopper device to generate on the display of the shopper device and via the user interface, a prompt for the given shopper to select, via further different shopper-selectable inputs displayed via the user interface, one of a cash payment and load-to-card upon obtaining the shopper selection of the one of the different shopper selectable inputs displayed via the user interface corresponding to cashback to the given shopper, and
      determine that the given product has been purchased by the given shopper, and upon the given product being purchased by the given shopper,
         apply the redeemable value according to the shopper-selected redemption channel and based upon the given promotion identifier by at least
            cooperating with the POS terminal to apply the redeemable value toward purchase of the given product at the POS terminal upon obtaining the shopper selection of the one of the different shopper-selectable inputs to the user interface corresponding to redemption at the POS terminal,
            cooperating with the digital wallet to apply the redeemable value toward purchase of the given product upon obtaining the shopper selection of the one of the different shopper-selectable inputs to the user interface corresponding to the future redemption,
            cooperating with a payments system to provide cashback to the given shopper in an amount equal to the redeemable value upon obtaining shopper selection of one of the further different shopper selectable inputs displayed via the user interface corresponding to cash payment, and
            cooperating with a payment card processing server associated with a given retailer to load the redeemable value to a payment card associated with the given retailer upon obtaining the shopper selection of the one of the further different shopper selectable inputs displayed via the user interface corresponding to load-to-card.

2. The digital promotion processing system of claim 1 wherein the given shopper has a loyalty identifier associated therewith for the given retailer at which the given product has been purchased; and wherein the promotion processing server is configured to save the digital promotion to the digital wallet associated with the given shopper based upon the loyalty identifier upon obtaining the shopper selection of the one of the different shopper-selectable inputs to the user interface corresponding to the future redemption.

3. The digital promotion processing system of claim 1 wherein a promotional budget is associated with the given promotion identifier; and wherein the promotion processing server is configured to debit the promotional budget with the redeemable value based upon each redemption of the digital promotion and irrespective of the plurality of different redemption channels.

4. The digital promotion processing system of claim 1 wherein the digital promotion processing server is configured to cooperate with the shopper device to determine a geographic location of the shopper device, and communicate the digital promotion based upon the geographic location.

5. The digital promotion processing system of claim 4 wherein the digital promotion processing server is configured to communicate the digital promotion based upon the shopper device being within a threshold geographic area of a retailer where the digital promotion is redeemable.

6. The digital promotion processing system of claim 1 wherein the digital promotion has an expiration associated therewith; and wherein the digital promotion processing server is configured to determine, upon the given product being purchased by the given shopper, whether the digital promotion has expired, and upon the given promotion not being expired, apply the redeemable value according to the shopper-selected redemption channel.

7. A promotion processing server comprising:
   a processor and an associated memory configured to generate a given promotion identifier associated with a digital promotion for a given product, the digital promotion redeemable via a plurality of different redemption channels and having a redeemable value associated therewith, the plurality of different redemption channels comprising redemption at a point-of-sale (POS) terminal, a future redemption, and cashback to a given shopper, communicate the digital promotion to a shopper device associated with the given shopper, communicate with the shopper device to cause the shopper device to generate, on a display of the shopper device a user interface including the digital promotion and a plurality of different shopper-selectable inputs representing the plurality of different redemption channels, cooperate with the shopper device to permit shopper-selection, via the user interface, of one of the plurality of different shopper-selectable inputs representing a corresponding one of the plurality of different redemption channels based upon display of the digital promotion on the display, communicate with the shopper device to obtain the shopper selection of the one of the different shopper-selectable inputs to the user interface, cooperate to save the digital promotion to a digital wallet associated with the given shopper upon obtaining the shopper selection of the one of the different shopper selectable inputs displayed via the user interface corresponding to the future redemption, communicate with the shopper device to cause the shopper device to generate on the display of the shopper device and via the user interface, a prompt for the given shopper to select, via further different shopper-selectable inputs displayed via the user interface, one of a cash payment and load-to-card upon obtaining the shopper selection of the one of the different shopper selectable inputs displayed via the user interface corresponding to cashback to the given shopper, and determine that the given product has been purchased by the given shopper, and upon the given product being purchased by the given shopper, apply the redeemable value according to the shopper-selected redemption channel and based upon the given promotion identifier by at least cooperating with the POS terminal to apply the redeemable value toward purchase of the given product at the POS terminal upon obtaining the shopper selection of the one of the different shopper-selectable inputs to the user interface corresponding to redemption at the POS terminal, cooperating with the digital wallet to apply the redeemable value toward purchase of the given product upon obtaining the shopper selection of the one of the different shopper-selectable inputs to the user interface corresponding to the future redemption, cooperating with a payments system to provide cashback to the given shopper in an amount equal to the redeemable value upon obtaining the shopper selection of one of the further different shopper selectable inputs displayed via the user interface corresponding to cash payment, and cooperating with a payment card processing server associated with a given retailer to load the redeemable value to a payment card associated with the given retailer upon obtaining the shopper selection of one of the further different shopper selectable inputs displayed via the user interface corresponding to load-to-card.

8. The promotion processing server of claim 7 wherein the given shopper has a loyalty identifier associated therewith for the given retailer at which the given product has been purchased; and wherein the processor is configured to save the digital promotion to the digital wallet associated with the given shopper based upon the loyalty identifier upon obtaining the shopper selection of the one of the different shopper-selectable inputs to the user interface corresponding to the future redemption.

9. The promotion processing server of claim 7 wherein a promotional budget is associated with the given promotion identifier; and wherein the processor is configured to debit the promotional budget with the redeemable value based upon each redemption of the digital promotion and irrespective of the plurality of different redemption channels.

10. The promotion processing server of claim 7 wherein the processor is configured to cooperate with the shopper device to determine a geographic location of the shopper device, and communicate the digital promotion based upon the geographic location.

11. The promotion processing server of claim 10 wherein the processor is configured to communicate the digital promotion based upon the shopper device being within a threshold geographic area of a retailer where the digital promotion is redeemable.

12. The promotion processing server of claim 7 wherein the digital promotion has an expiration associated therewith; and wherein the processor is configured to determine, upon the given product being purchased by the given shopper, whether the digital promotion has expired, and upon the given promotion not being expired, apply the redeemable value according to the shopper-selected redemption channel.

13. A method of processing a digital promotion comprising:

using a promotion processing server to generate a given promotion identifier associated with a digital promotion for a given product, the digital promotion redeemable via a plurality of different redemption channels and having a redeemable value associated therewith, the plurality of different redemption channels comprising redemption at a point-of-sale (POS) terminal, a future redemption, and cashback to a given shopper, communicate the digital promotion to a shopper device associated with the given shopper, communicate with the shopper device to cause the shopper device to generate display, on a display of the shopper device a user interface including the digital promotion and a plurality of different shopper-selectable inputs representing the plurality of different redemption channels, cooperate with the shopper device to permit shopper-selection, via the user interface, of one of the plurality of different shopper-selectable inputs representing a corresponding one of the plurality of different redemption channels based upon display of the digital promotion on the display, communicate with the shopper device to obtain the shopper selection of the one of the different shopper-selectable inputs to the user interface, cooperate to save the digital promotion to a digital wallet associated with the given shopper upon obtaining the shopper selection of the one of the different shopper-selectable inputs to the user interface corresponding to the future redemption, communicate with the shopper device to cause the shopper device to generate on the display of the shopper device and via the user interface, a prompt for the given shopper to select, via further different shopper selectable inputs displayed via the user interface, one of a cash payment and load-to-card upon obtaining the shopper selection of the one of the different shopper selectable inputs displayed via the user interface corresponding to cashback to the given shopper, and determine that the given product has been purchased by the given shopper, and upon the given product being purchased by the given shopper, apply the redeemable value according to the shopper-selected redemption channel and based upon the given promotion identifier by at least cooperating with the POS terminal to apply the redeemable value toward purchase of the given product at the POS terminal upon obtaining the shopper selection of the one of the different shopper-selectable inputs to the user interface corresponding to redemption at the POS terminal, cooperating with the digital wallet to apply the redeemable value toward purchase of the given product upon obtaining the shopper selection of the one of the different shopper selectable inputs displayed via the user interface corresponding to the future redemption, cooperating with a payments system to provide cashback to the given shopper in an amount equal to the redeemable value upon obtaining the shopper selection of one of the further different shopper selectable inputs displayed via the user interface corresponding to cash payment, and cooperating with a payment card processing server associated with a given retailer to load the redeemable value to a payment card associated with the given retailer upon obtaining the shopper selection of the one of the further different shopper selectable inputs displayed via the user interface corresponding to load-to-card.

14. The method of claim 13 wherein the given shopper has a loyalty identifier associated therewith for the given retailer at which the given product has been purchased; and wherein using the promotion processing server comprises using the promotion processing server to save the digital promotion to the digital wallet associated with the given shopper based upon the loyalty identifier upon obtaining the shopper selection of the one of the different shopper-selectable inputs to the user interface corresponding to the future redemption.

15. The method of claim 13 wherein using the promotion processing server comprises using the promotion processing server to cooperate with the shopper device to determine a geographic location of the shopper device, and communicate the digital promotion based upon the geographic location.

16. The method of claim 13 wherein the digital promotion has an expiration associated therewith; and wherein using the promotion processing server comprises using the promotion processing server to determine, upon the given product being purchased by the given shopper, whether the digital promotion has expired, and upon the given promotion not being expired, apply the redeemable value according to the shopper-selected redemption channel.

17. A non-transitory computer readable medium for processing a digital promotion, the non-transitory computer readable medium comprising computer executable instructions that when executed by a processor cause the processor to perform operations comprising:

generating a given promotion identifier associated with a digital promotion for a given product, the digital promotion redeemable via a plurality of different redemption channels and having a redeemable value associated therewith, the plurality of different redemption channels comprises redemption at a point-of-sale (POS) terminal, a future redemption, and cashback to a given shopper;

communicating the digital promotion to a shopper device associated with the given shopper;

cooperating communicating with the shopper device to cause the shopper device to generate, on a display of the shopper device a user interface including the digital promotion and a plurality of different shopper-selectable inputs representing the plurality of different redemption channels;

cooperating with the shopper device to permit shopper-selection, via the user interface, of one of the plurality of different shopper-selectable inputs representing a corresponding one of the plurality of different redemption channels based upon display of the digital promotion on the display;

cooperating communicating with the shopper device to obtain the shopper selection of the one of the different shopper-selectable inputs to the user interface;

cooperating to save the digital promotion to a digital wallet associated with the given shopper when upon obtaining the shopper selection of one of the different shopper selectable inputs displayed via the user interface corresponding to the future redemption;

communicating with the shopper device to cause the shopper device to generate on the display of the shopper device and via the user interface, a prompt for the given shopper to select, via further different shopper-selectable inputs displayed via the user interface, one of a cash payment and load-to-card upon obtaining the shopper selection of one of the further different shopper selectable inputs displayed via the user interface corresponding to cashback to the given shopper; and determining that the given product has been purchased by the given shopper, and upon the given product being purchased by the given shopper, applying the redeemable value according to the shopper-selected redemption channel and based upon the given promotion identifier by at least cooperating with the POS terminal to apply the redeemable value toward purchase of the given product at the POS terminal upon obtaining the shopper selection of the one of the different shopper-selectable inputs to the user interface corresponding to redemption at the POS terminal, cooperating with the digital wallet to apply the redeemable value toward purchase of the given product upon obtaining the shopper selection of the one of the different shopper-selectable inputs to the user interface corresponding to the future redemption, cooperating with a payments system to provide cashback to the given shopper in an amount equal to the redeemable value upon obtaining the shopper selection of one of the further different shopper selectable inputs displayed via the user interface corresponding to cash payment, and cooperating with a payment card processing server associated with a given retailer to load the redeemable value to a payment card associated with the given retailer upon obtaining the shopper selection of the one of the further different shopper selectable inputs displayed via the user interface corresponding to load-to-card.

18. The non-transitory computer readable medium of claim 17 wherein the given shopper has a loyalty identifier associated therewith for the given retailer at which the given product has been purchased; and wherein the operations comprise saving the digital promotion to the digital wallet associated with the given shopper based upon the loyalty identifier upon obtaining the shopper selection of the one of the different shopper-selectable inputs to the user interface corresponding to the future redemption.

19. The non-transitory computer readable medium of claim 17 wherein the operations comprise cooperating with the shopper device to determine a geographic location of the shopper device, and communicate the digital promotion based upon the geographic location.

20. The non-transitory computer readable medium of claim 17 wherein the digital promotion has an expiration associated therewith; and wherein the operations comprise determining, upon the given product being purchased by the given shopper, whether the digital promotion has expired, and upon the given promotion not being expired, apply the redeemable value according to the shopper-selected redemption channel.

* * * * *

UNITED STATES PATENT AND TRADEMARK OFFICE
CERTIFICATE OF CORRECTION

PATENT NO. : 11,880,860 B1  
APPLICATION NO. : 17/870580  
DATED : January 23, 2024  
INVENTOR(S) : Jump et al.

Page 1 of 1

It is certified that error appears in the above-identified patent and that said Letters Patent is hereby corrected as shown below:

In the Claims

Column 10, Line 54, Claim 13   Delete: "generate display"  
                                                Insert: --generate--

Column 12, Line 21, Claim 16   Delete: "cooperating"

Column 12, Line 33, Claim 16   Delete: "cooperating"

Column 12, Line 37, Claim 16   Delete: "when"

Signed and Sealed this  
Fifteenth Day of April, 2025

Coke Morgan Stewart  
*Acting Director of the United States Patent and Trademark Office*